United States Patent Office 3,478,175
Patented Nov. 11, 1969

3,478,175
DIRECT CURRENT SIGNAL RECEIVER
Eberhard Herter, Stuttgart, Germany, assignor to International Standard Electric Corporation
Filed Nov. 3, 1966, Ser. No. 591,731
Claims priority, application Germany, Nov. 9, 1965,
St 24,616
Int. Cl. H04m 3/20
U.S. Cl. 179—18                                    7 Claims

ABSTRACT OF THE DISCLOSURE

A stable control AC voltage is coupled into the control circuit of a transistor switching stage which controls the power to a succeeding relay. The transistor is subject to control from a DC source and in its quiescent state cannot be caused to operate by the AC voltage alone. Similarly, when operating fully in accordance with design, the AC voltage alone will not interfere with continued operation of the transistor. If unusual interference signals are encountered, however, the AC signal will prevent power excursions which could damage the transistor and also will produce anomalous outputs from the transistor which can be used to signal failure of the system.

---

The invention relates to a circuit arrangement to receive DC signals and more particularly to such receivers comprising transistor controlled relays wherein the operating curve of the transistor switching stage intersects the admissible power hyperbola.

When designing such receivers, the transistor is operated as a switch so that the transistor loss is kept small. A relay of relatively high power can be switched through such a transistor switching stage. Care must be taken, of course, when designing such a switching stage that, in the non-operative condition, the transistor is safely blocked by a sufficient bias and that, in the operative condition, the control voltage is sufficient to safely saturate the transistor. The operating line or characteristic of the transistorized switching circuit can intersect the admissible power hyperbola, because this critical operating range is passed through with sufficient speed to preclude damaging the transistor.

If such a receiving device is operated by a DC fed line, the conditions at open and closed line loop can be controlled without difficulties and the relay can be switched as required. However, interferences of any kind, for example, leakages, short-circuits and external noise signals or voltages, may cause the control voltage in the control circuit of the transistor switching stage to drop until the transistor is operated at an inappropriate or wrong operating or Q-point. Further, the interference can prevent the transistor switching stage from switching so that the wrong operating condition prevails for a long time and leads, in case of an excessive load, frequently to the destruction of the transistor.

It is the object of the invention to improve the receiving circuit arrangement when the arrangement includes a transistor switching stage controlling a relay. The load line of the relay loaded transistor intersects the admissible power hyperbola so that even when the transistor switching stage is improperly operated due to a fault condition, the transistor itself is not destroyed and a signal to indicate the faulty condition can be derived, if so required.

The circuit arrangement to receive DC signals in accordance with the invention, is provided with a regulated AC voltage that is coupled into the control circuit of the transistor switching stage. When a DC operating point is established the power loss of the transistor is periodically changed with the AC voltage according to the power hyperbola, so that the resulting power loss remains below the admissible value of the constant power loss. The inventive arrangement prevents the proper switching operation from being adversely influenced. If the transistor switching stage is not operated, the regulated or control AC voltage is suppressed by a suitable bias in the control circuit and if the transistor switching stage is operated, the effect of the regulated or control AC voltage in the output circuit is prevented by over-riding of the control circuit.

The arrangement according to a further embodiment of the invention is still more simplified in that the constant control AC voltage is common for several switching stages. It is quite possible thereby to provide different threshold voltages for the different switching stages. The voltage dividers for these threshold voltages of the different switching stages are mutually coupled via a common control AC voltage source.

In order to eliminate the reaction of the control AC voltage on the supervised line, it is provided, according to a further embodiment of the arrangement, that, in case of a multi-stage arrangement of the receiving facility, the constant AC control voltage is fed in behind the first switching stage or amplifying stage.

When operating single stage receiving devices the reaction of the control AC voltage on the supervised line can be kept low by a voltage of low frequency. These interfering voltages on the line are not perceived, because sound effects caused by voltages of low frequency can hardly be heard.

If the receiving device is connected to a subscriber line or to a junction line of a telephone exchange system, the constant control AC voltage may be derived from the ringing AC voltage of the system. In order to keep the harmonics of this ringing voltage from the lines, a suitable filter, in the most simple case a leakage capacitor, is provided in the feeder circuit of the ringing AC voltage.

In case of faulty operation of a switching stage the controlled relay responds and drops in the rhythm of the control AC voltage. This constant change of the switching condition of the relay can be used in a way known per se to indicate the faulty condition.

The invention is in detail explained with the aid of the accompanying drawings, wherein.

Figure 1:
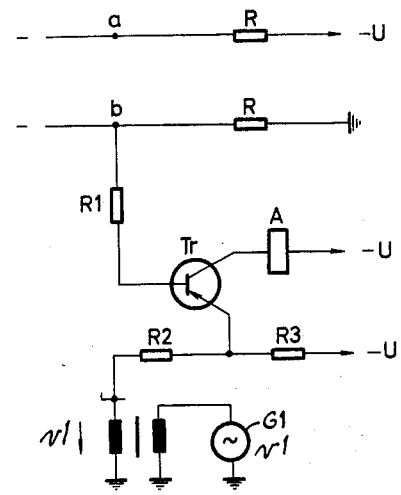
FIG. 1 shows an arrangement to receive DC signals, according to the invention.

FIG. 1 shows two feeder resistor R of a DC-fed line $a$, $b$. The control circuit of the switching transistor $Tr$ is coupled to the $b$-wire behind the feeder resistor R via the resistor R1. The resistor R1 leads to the base of transistor $Tr$, and conducts ground potential when the line is open. The emitter of transistor $Tr$ is connected to the tap of the voltage divider, consisting of the resistors R2 and R3. The pnp-type transistor $Tr$ is blocked by the voltage drop at the resistor R2. The control AC voltage $v1$, coupled into the control circuit, increases this blocking bias during one-half of the wave and reduces it in the other half wave. The resulting votlage in the control circuit, however, always is sufficient to block the transistor $Tr$ so that it remains non-conductive. Therefore, relay A in the collector circuit of the transistor is not energized when the line $a$, $b$ is open.

When the line $a$, $b$ is closed to a loop, the potential at the $b$-wire becomes heavily negative so that the transistor $Tr$ is actuated to saturation. The bias across the voltage divider R2, R3 and the constant control AC voltage $v1$ is insufficient to prevent the transistor's operation at this control voltage, consequently, relay A is operated. These explanations show that a proper switching operation is obtained despite coupling in said control AC voltage.

However, if there is a fault causing the line to have a potential applied to it outside prescribed values, the transistor is operated via the tapped control voltage to an operating point beyond the admissible power hyperbola, and then the control AC voltage $v1$ can be effective. This control AC voltage $v1$ can be selected so that the operating point on the characteristic curve is periodically changed so that the resulting power loss drops below the admissible value of the constant power loss hyperbola. The operation of the relay can thereby vary in the rhythm of the control AC voltage between the operated and non-operated positions. This constant response of relay A can be used in a simple way to indicate trouble.

FIG. 1 shows that the control AC voltage $v1$ is derived for several such switching stages from a source such as the ringing AC voltage generator G1. The arrow at the feeder winding of a transformer indicates that several switching stages can be connected.

Figure 2:
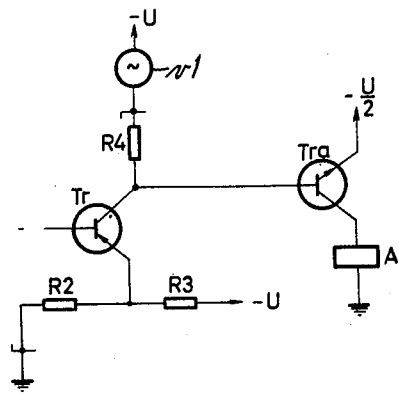
FIG. 2 shows a twin-stage transistor witching stage according to the invention.

FIG. 2 shows a two-stage switching amplifier, the first stage of which is coupled to the line to be supervised in the same way as shown in FIG. 1. The control circuit of transistor $Tr$ is not coupled to the AC control voltage, because this transistor does not have to deliver great power and can therefore be operated as an amplifier. The control AC voltage $v1$ is coupled into the collector circuit of transistor $Tr$ through the resistor R4, so that for the following npn-type stage transistor $Tra$ the same operating conditions prevail as for the transistor $Tr$ shown in FIG. 1.

The operating bias for transistor $Tra$ is obtained by the voltage source $U/-2$ at the emitter of transistor $Tra$. The relay A in the collector circuit leads to ground potential.

It is also possible to supply several such two-stage switching amplifiers by a common control AC voltage $v1$, as indicated by the arrow at the collector resistor R4.

Figure 3:
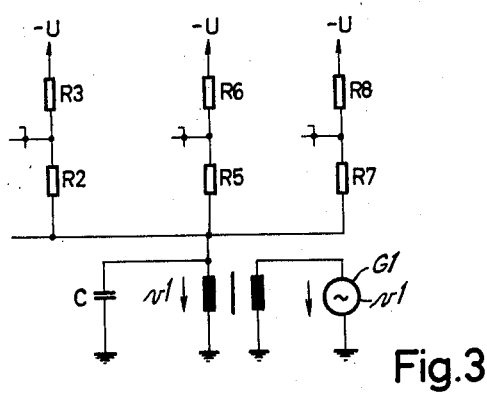
FIG. 3 shows the derivation of the common control AC voltage for switching stages with different threshold voltages.

FIG. 3 shows how different switching amplifiers can be power-fed by a common control AC voltage $v1$. The voltage divider R2, R3 and R5, R6 and R7, R8 offer different biasses at their tapping points, which biasses can be led to several similar switching stages as shown in FIG. 1. All voltage dividers are led across the control AC voltage source $v1$, so that this control AC voltage $v1$ is applied to all control circuits of all switching stages.

The voltage $v1$ is derived from the ringing voltage from a generator indicated at G1 through a transformer. As this ringing AC voltage shows a considerable percentage of harmonics, the secondary end of the transformer is provided with a leakage capacitor C. It is thereby achieved that the interfering voltages reaching the lines over the control are negligibly small.

While the principles of the invention have been described above in connection with specific apparatus and applications, it is to be understood that this description is made only by way of example and not as a limitation on the scope of the invention.

I claim:

1. A direct current signalling receiver for receiving signals transmitted over a line comprising a transistor forming a switching stage, relay means controlled by said switching stage, means for biasing said switching stage to operate said transistor to a saturated condition responsive to a closed loop condition of said line and to operate said transistor to a non-saturated condition responsive to an open loop condition of said line, said basing means providing an operating characteristic for said switching stage that intersects the admissible power hyperbola, and means for coupling a constant alternating current voltage to the control circuit of said transistor, said alternating current voltage being selected to have insufficient magnitude to control the operation of the transistor in the presence of prescribed conditions of operation of said loop but being selected to have sufficient magnitude to control operation of said transistor when said loop operation is outside said prescribed conditions.

2. The circuit arrangement of claim 1 wherein means are provided for coupling said constant control AC voltage in common to several switching stages.

3. The circuit arrangement of claim 2, including voltage dividers in said bias circuits for providing threshold voltages for the different switching stages, means for connecting said threshold voltages over said common, constant control AC voltage.

4. The circuit arrangement according to claim 3 wherein said switching stage comprises a multi-stage arrangement, means for connecting the constant control AC voltage to the first switching stage, and means in the second switching stage for controlling the relay.

5. The circuit arrangement of claim 4 wherein means are provided for deriving the constant control AC voltage from ringing voltage.

6. The circuit arrangement of claim 5 wherein leakage capacitor means are provided for filtering the harmonics of the ringing voltage.

7. The circuit arrangement of claim 4 wherein the relay is connected to a second switching stage, and in case of operation of the receiving device outside prescribed limits, the second switching stage causes the relay to respond and to drop in the rhythm of the contral AC voltage, and this constant switching of the relay is used to indicate the faulty condition.

References Cited
UNITED STATES PATENTS 2,320,076  5/1943  Hall.
2,835,740  5/1958  Heetman.

KATHLEEN H. CLAFFY, Primary Examiner

W. A. HELVESTINE, Assistant Examiner